United States Patent
Nory et al.

(10) Patent No.: US 12,425,970 B2
(45) Date of Patent: *Sep. 23, 2025

(54) RADIO NETWORK NODE, USER EQUIPMENT AND METHODS PERFORMED IN A WIRELESS COMMUNICATION NETWORK

(71) Applicant: Telefonaktiebolaget LM Ericsson (publ), Stockholm (SE)

(72) Inventors: Ravikiran Nory, San José, CA (US); Ajit Nimbalker, Fremont, CA (US); Sorour Falahati, Stockholm (SE); Havish Koorapaty, Saratoga, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 148 days.

This patent is subject to a terminal disclaimer.

(21) Appl. No.: 18/343,333

(22) Filed: Jun. 28, 2023

(65) Prior Publication Data

US 2023/0345374 A1 Oct. 26, 2023

Related U.S. Application Data

(63) Continuation of application No. 17/566,150, filed on Dec. 30, 2021, now Pat. No. 11,696,233, which is a
(Continued)

(51) Int. Cl.
*H04W 52/02* (2009.01)
*H04W 72/23* (2023.01)
(Continued)

(52) U.S. Cl.
CPC ... *H04W 52/0235* (2013.01); *H04W 52/0225* (2013.01); *H04W 52/0229* (2013.01);
(Continued)

(58) Field of Classification Search
CPC . H04W 52/0235; H04W 72/23; H04W 76/28; H04W 76/27; H04W 52/0229; H04W 52/0225; Y02D 30/70
See application file for complete search history.

(56) References Cited

U.S. PATENT DOCUMENTS

| | | | |
|---|---|---|---|
| 11,252,668 B2 | 2/2022 | Nory | |
| 11,696,233 B2 * | 7/2023 | Nory | H04W 72/23 370/311 |

(Continued)

FOREIGN PATENT DOCUMENTS

| | | |
|---|---|---|
| CN | 105009661 A | 10/2015 |
| CN | 107079453 A | 8/2017 |

OTHER PUBLICATIONS

U.S. Appl. No. 62/885,399, Method and apparatus for PDCCH monitoring adaptation, Aug. 12, 2019, pp. 1-21. (Year: 2019).
(Continued)

*Primary Examiner* — Omar J Ghowrwal
(74) *Attorney, Agent, or Firm* — Baker Botts L.L.P.

(57) ABSTRACT

Embodiments herein relate to a method performed by a user equipment, UE (10), for communicating in a wireless communication network.

The UE (10) receives a wake-up signal with a multibit indication from a radio network node (12), wherein the multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell. The UE (10) further performs an action related to the wake-up signal taking the received multibit indication into account.

26 Claims, 16 Drawing Sheets

Related U.S. Application Data continuation of application No. 17/114,672, filed on Dec. 8, 2020, now Pat. No. 11,252,668, which is a continuation of application No. PCT/EP2020/076024, filed on Sep. 17, 2020.

(60) Provisional application No. 62/902,428, filed on Sep. 19, 2019.

(51) Int. Cl.
  *H04W 76/28* (2018.01)
  *H04W 76/27* (2018.01)

(52) U.S. Cl.
  CPC ........... *H04W 72/23* (2023.01); *H04W 76/28* (2018.02); *H04W 76/27* (2018.02); *Y02D 30/70* (2020.08)

(56) References Cited

U.S. PATENT DOCUMENTS

| | | |
|---|---|---|
| 2019/0021052 A1 | 1/2019 | Kadiri et al. |
| 2019/0097874 A1 | 3/2019 | Zhou et al. |
| 2019/0124558 A1 | 4/2019 | Ang et al. |
| 2019/0141695 A1 | 5/2019 | Babaei et al. |
| 2019/0254110 A1 | 8/2019 | He et al. |
| 2020/0214078 A1 | 7/2020 | Jiang |
| 2021/0022202 A1 | 1/2021 | Kim |
| 2021/0051698 A1 | 2/2021 | Tsai |

OTHER PUBLICATIONS

3GPP TSG-RAN WG1 Meeting #100-e; E-meeting; Change Request; Title: Corrections for power saving; Source to WG: Huawei; Source to TSG: R1 (R1-2005132)—May 25-Jun. 5, 2020.

3GPP TSG-RAN WG1 Meeting #101-e; e-meeting; Change Request; Title: Corrections on UE power savings; Source to WG: Samsung; Source to TSG: R1 (R1-2005141)—May 25-Jun. 5, 2020.

3GPP TSG-RAN WG1 Meeting #101-3; e-meeting; Change Request; Title: Corrections of cross-slot scheduling restriction; Source to WG: Nokia, Nokia Shanghai Bell; Source to TSG: R1 (R1-2005152)—May 25-Jun. 5, 2020.

3GPP TSG-RAN Meeting #88; Online; Source: RAN1; Title: Corrections for power saving—outcomes of RAN1#100-e & RAN1#101-e (RP-200693)—Jun. 29-Jul. 3, 2020.

PCT Notification of Transmittal of the International Search Report and the Written Opinion of the International Searching Authority, or the Declaration issued for International application No. PCT/EP2020/076024—Dec. 23, 2020.

China Patent Office Official Action and Search Report in CN 202080065543.5 dated Nov. 29, 2023 (not translated).

\* cited by examiner

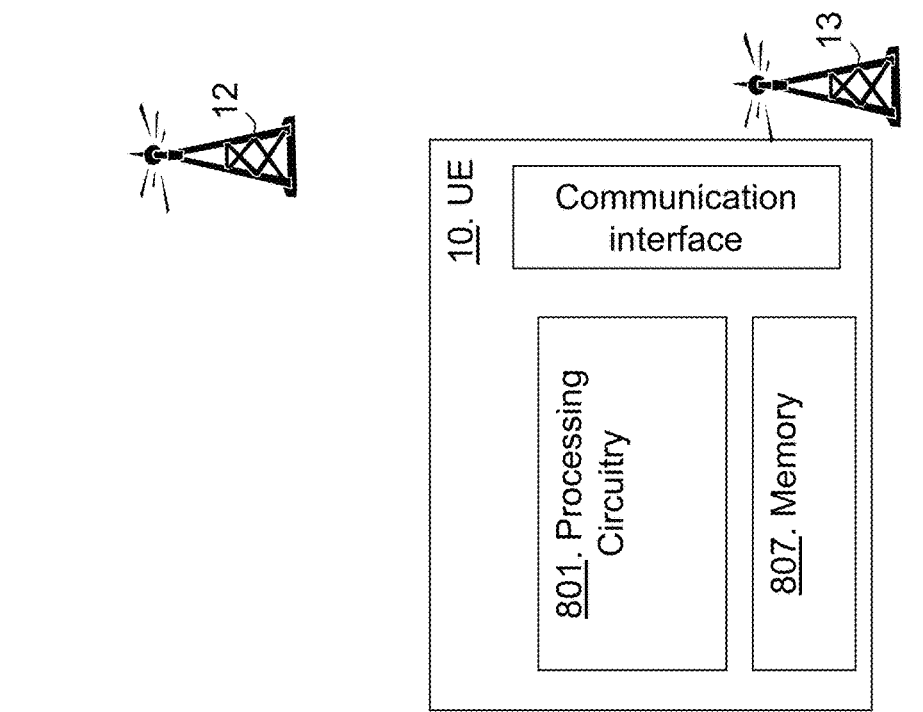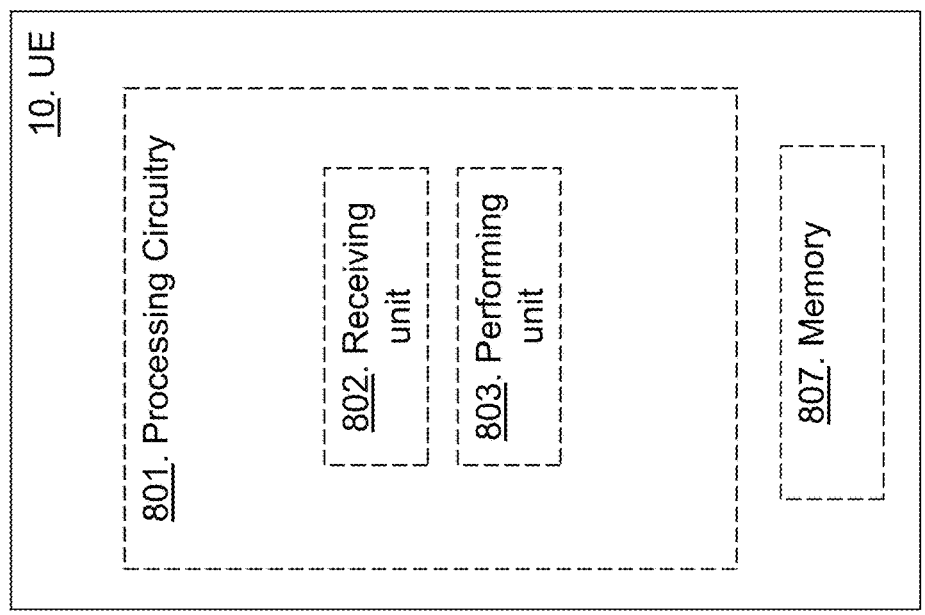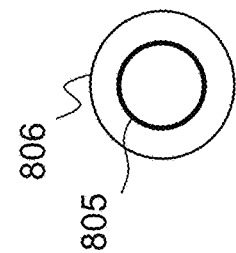
Fig. 4

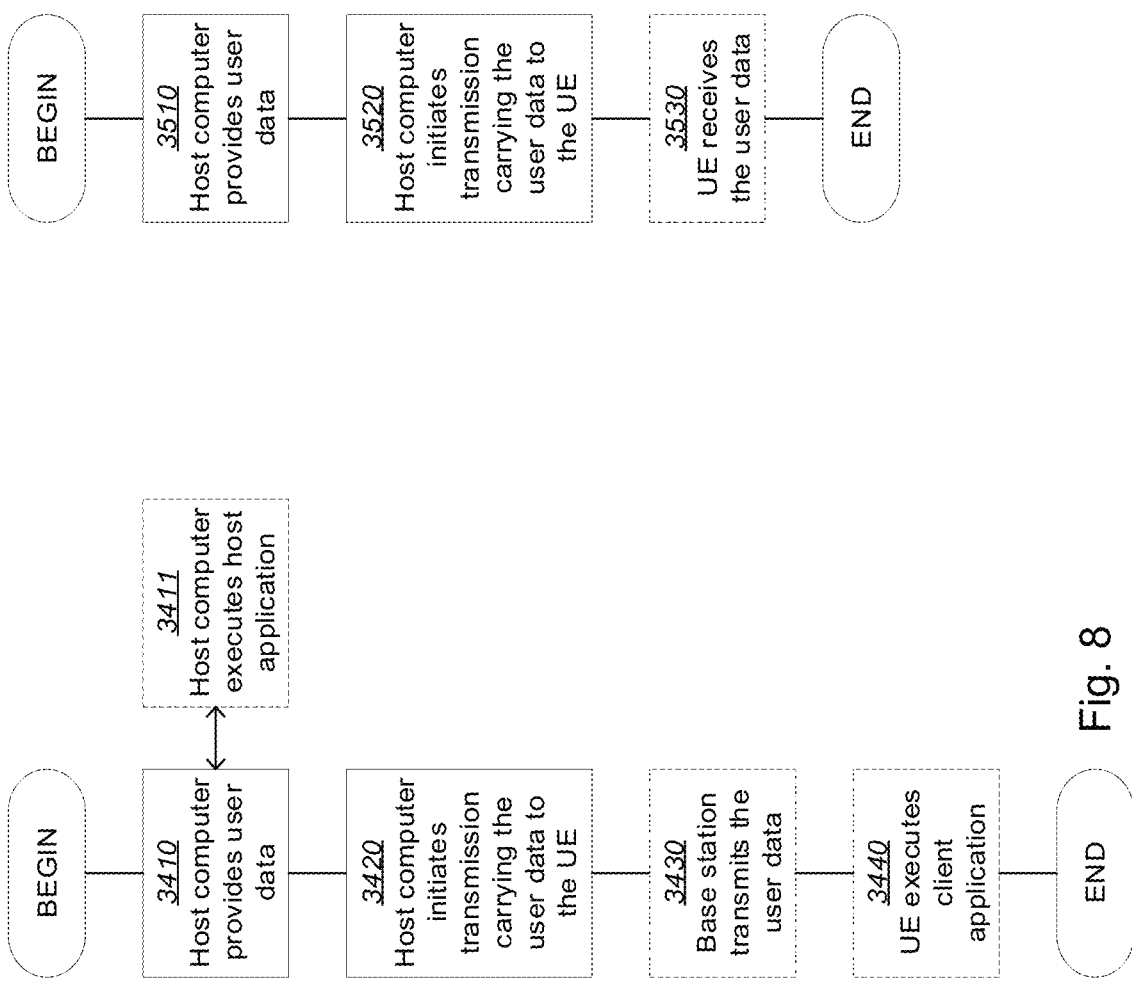

RADIO NETWORK NODE, USER EQUIPMENT AND METHODS PERFORMED IN A WIRELESS COMMUNICATION NETWORK

PRIORITY

This application is a continuation, under 35 U.S.C. § 120, of U.S. patent application Ser. No. 17/566,150 filed on Dec. 30, 2021 which is a continuation, under 35 U.S.C. § 120, of U.S. patent application Ser. No. 17/114,672 filed on Dec. 8, 2020, now U.S. Pat. No. 11,252,668, which is a continuation, under 35 U.S.C. § 111 (a) of International Patent Application Serial No. PCT/EP2020/076024 filed Sep. 17, 2020 and entitled "Radio Network Node, User Equipment and Methods Performed in a Wireless Communication Network" which claims priority to U.S. Provisional Patent Application No. 62/902,428 filed Sep. 19, 2019, both of which are hereby incorporated by reference in their entirety.

TECHNICAL FIELD

Embodiments herein relate to a radio network node, a user equipment (UE) and methods performed therein regarding wireless communication. Furthermore, a computer program product and a computer-readable storage medium are also provided herein. Especially, embodiments herein relate to handling or enabling communication, e.g. handling wake-up signals (WUS) from the radio network node in a wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3rd Generation Partnership Project (3GPP) and this work continues in the coming 3GPP releases (Rel), such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Carrier Aggregation (CA) is generally used in NR (5G) and LTE systems to improve UE transmit receive data rate. With carrier aggregation, the UE typically operates initially on a single serving cell called a primary cell (Pcell). The Pcell is operated on a component carrier in a frequency band. The UE is then configured by the network with one or more secondary cells (SCell) or secondary serving cells (SScell(s)). Each Scell can correspond to a component carrier (CC) in the same frequency band (intra-band CA) or different frequency band (inter-band CA) from the frequency band of the CC corresponding to the Pcell. For the UE to transmit/receive data on the Scell(s) (e.g., by receiving downlink-shared channel (DL-SCH) information on a physical downlink shared channel (PDSCH) or by transmitting uplink-shared channel (UL-SCH) on a physical uplink shared channel (PUSCH), the Scell(s) need to be activated by the network. The Scell(s) may also be deactivated and later reactivated as needed via activation/deactivation signalling.

FIG. 1 illustrates Scell activation/deactivation related procedures specified for Rel15 NR. As shown in the figure, except for channel state information (CSI) reporting, the UE is allowed to start performing other 'activation related actions', e.g. physical downlink control channel (PDCCH) monitoring for Scell, physical uplink control channel (PUCCH)/sounding reference signal (SRS) transmission on the Scell, within a specified range of slots. I.e., after the minimum required activation delay, specified in TS 38.213 v. 15.0.0, and before the maximum allowed activation delay, specified in TS 38.133 v 15.0.0. CSI reporting for the Scell starts, and stops, with a fixed slot offset after receiving the activation, or deactivation, command.

It is first indicated a slot in which Scell activation command, e.g., medium access control (MAC) control element (CE), is received. Then, it is indicated a Slot, diagonally striped, where the UE starts channel state information (CSI) reporting for Scell. Out of range (OOR) is reported until Scell is not activated. UE may start PDCCH monitoring and apply other activation related actions from this slot. Furthermore, it is shown a Slot, horizontally striped, by which the UE shall start PDCCH monitoring and apply other activation related action described in 38.321 v. 15.0.0 sub-clause 5.9. Deactivation process is also shown in FIG. 1 where it is shown a slot in which Scell deactivation command (MAC CE) is received. The UE may stop PDCCH monitoring and apply other deactivation related actions from this slot. Then, it is indicated a slot, diagonally striped, where the UE shall stop PDCCH monitoring and apply other deactivation related action described in 38.321 v. 15.0.0 subclause 5.9. Furthermore, it is indicated the slot where the UE stops CSI reporting for Scell.

Below is shown a minimum required activation delay and a maximum allowed activation delay for some example conditions:

Minimum required activation delay is k1+3 ms+1 slots as specified in 38.213 sub clause 4.3. Assuming 30 kHz numerology for Pcell, and k1=4, this would be 5.5 ms.

Maximum allowed activation delay depends on conditions described in 38.133 sub clause 8.3.2 and the value varies based on UE measurement configuration, operating frequency range and other aspects.

Assuming T_HARQ in 38.133 v. 15.0.0 has similar meaning as k1 in 38.213, and assuming 'known Scell' with Scell measurement cycle is equal to or smaller than [160 ms], and T_csi_reporting=4slots. For FR1 and 30 kHz SCS, If synchronization signal (SS) block based radio resource management (RRM) measurement timing configuration (SMTC) periodicity 5 ms, the delay cannot be larger than (T_HARQ=4slots)+(T_act_time=5 ms+5 ms)+(T_csi_report=4slots)=14 ms;

SMTC periodicity 20 ms, the delay cannot be larger than (T_HARQ=4slots)+(T_act_time=5 ms+20 ms)+(T_csi_report=4slots)=29 ms.

For FR2, assuming this is the first Scell being activated in that FR2 band,

SMTC periodicity 5 ms, the delay is 4slots+5 ms+TBD*5 ms+4slots=6 ms+X*5 ms;

SMTC periodicity 20 ms, the delay is 4slots+5 ms+TBD*20 ms+4slots=6 ms+X*20 ms;

X>1 is to be decided (TBD) in current Rel15 specs.

For other conditions, e.g., Scell is not 'known' and SMTC periodicities are longer, the maximum allowed activation delay is much longer than the values in the above example.

To get around large activation delays, dormancy-like behavior is being considered by allowing a UE to stay in activated state on Scells, but use layer one (L1) indication to adapt PDCCH monitoring for the Scells, while allowing the UE to continue performing CSI reporting/measurements.

UE power consumption: To reduce UE power consumption, multiple techniques such as using wake-up signaling are being considered. Significant power can be spent on monitoring the PDCCH in NR as a UE needs to perform blind detection in its configured control resource sets (CORESET) to identify whether there is a PDCCH sent to it. Techniques that can reduce unnecessary PDCCH monitoring or allowing the UE to go to sleep or wake-up only when required can be beneficial, and wake-up signaling is one approach being considered for reducing UE power consumption.

SUMMARY

Regarding Scell indication in the wake-up signal (WUS), existing solutions do not show the UE behavior. Also, existing solutions do not clearly address the UE behavior in case of simultaneous configuration of WUS and multiple DRX configurations within one cell group.

An object of embodiments herein is to provide a mechanism that improves the performance of the wireless communication network.

According to an aspect, the object is achieved by providing a method performed by a UE for communicating in a wireless communication network. The UE receives a wake-up signal with a multibit indication from a radio network node, wherein the multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell. The UE then performs an action related to the wake-up signal taking the received multibit indication into account.

According to another aspect the object is achieved by providing a method performed by a radio network node for handling communication of a UE in a wireless communication network. The radio network node transmits a wake-up signal with a multibit indication to the UE, wherein the multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell. Thus, the multibit indication indicates whether the wake-up signal is for a first cell, e.g., a first serving cell such as a primary cell, or a second cell, e.g., a secondary serving cell such as a secondary cell.

According to still another aspect, the object is achieved by providing a UE and a radio network node configured to perform the methods herein. Thus, it is herein provided a UE for communicating in a wireless communication network. The UE is configured to receive a wake-up signal with a multibit indication from a radio network node, wherein the multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell. The UE is further configured to perform an action related to the wake-up signal taking the received multibit indication into account. Furthermore, it is herein provided a radio network node for handling communication of a UE in a wireless communication network. The radio network node is configured to transmit a wake-up signal with a multibit indication to the UE, wherein the multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell.

It is furthermore provided herein a computer program product comprising instructions, which, when executed on at least one processor, cause the at least one processor to carry out any of the methods above, as performed by the radio network node, or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node, or the UE, respectively.

It is herein disclosed a solution where a WUS includes a multibit indication being separate indications for e.g. Pcell and Scells. For example, if the first bit, e.g., being a Pcell indication in WUS, indicates 'wake-up', the UE starts an on-duration timer at next on-duration instance according to a DRX pattern; otherwise the UE does not start the on-duration timer. For an Scell, if the second bit indicates 'wake-up', the UE applies corresponding actions of dormancy indicator wake-up; otherwise the UE applies corresponding actions of dormancy indicator sleep. Interaction with discontinuous reception (DRX) procedure and dormancy behavior for Scells are, by embodiments herein, taken into account in the design related to an Scell indication in the WUS.

It is further disclosed, herein, a timer-based mechanism that may complement layer one (L1)-based indication for transitioning between dormancy and non-dormancy behavior and potential default behavior at the start of on-duration.

If the UE is configured with multiple DRX configurations, WUS may contain a separate indication per DRX configuration to inform whether to start (or not) on-duration timer for the corresponding DRX configuration.

Thus, it is herein disclosed a solution that allows an efficient monitoring of cells using the WUS with the multibit indication, resulting in an improved performance of the wireless communication network.

BRIEF DESCRIPTION OF THE DRAWINGS

Embodiments will now be described in more detail in relation to the enclosed drawings, in which:

FIG. 4 is a block diagram depicting a UE according to embodiments herein;

FIGS. 8-11 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018-06)). It is understood, that the problems and solutions described herein are equally applicable to wireless access networks and user-equipments (UE) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
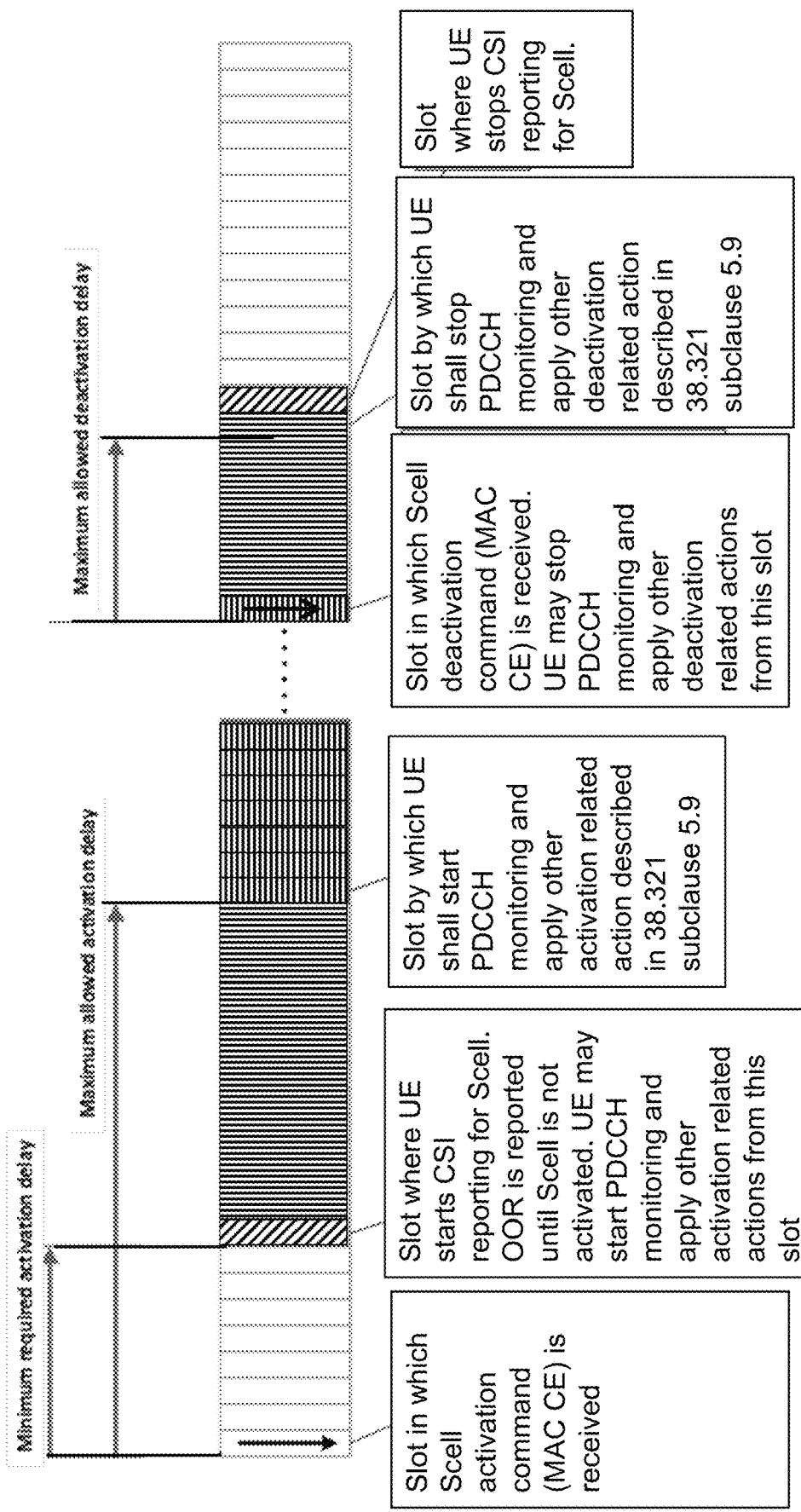
FIG. 1 illustrates Scell activation/deactivation related procedures specified for Rel15 NR.
Figure 2A:
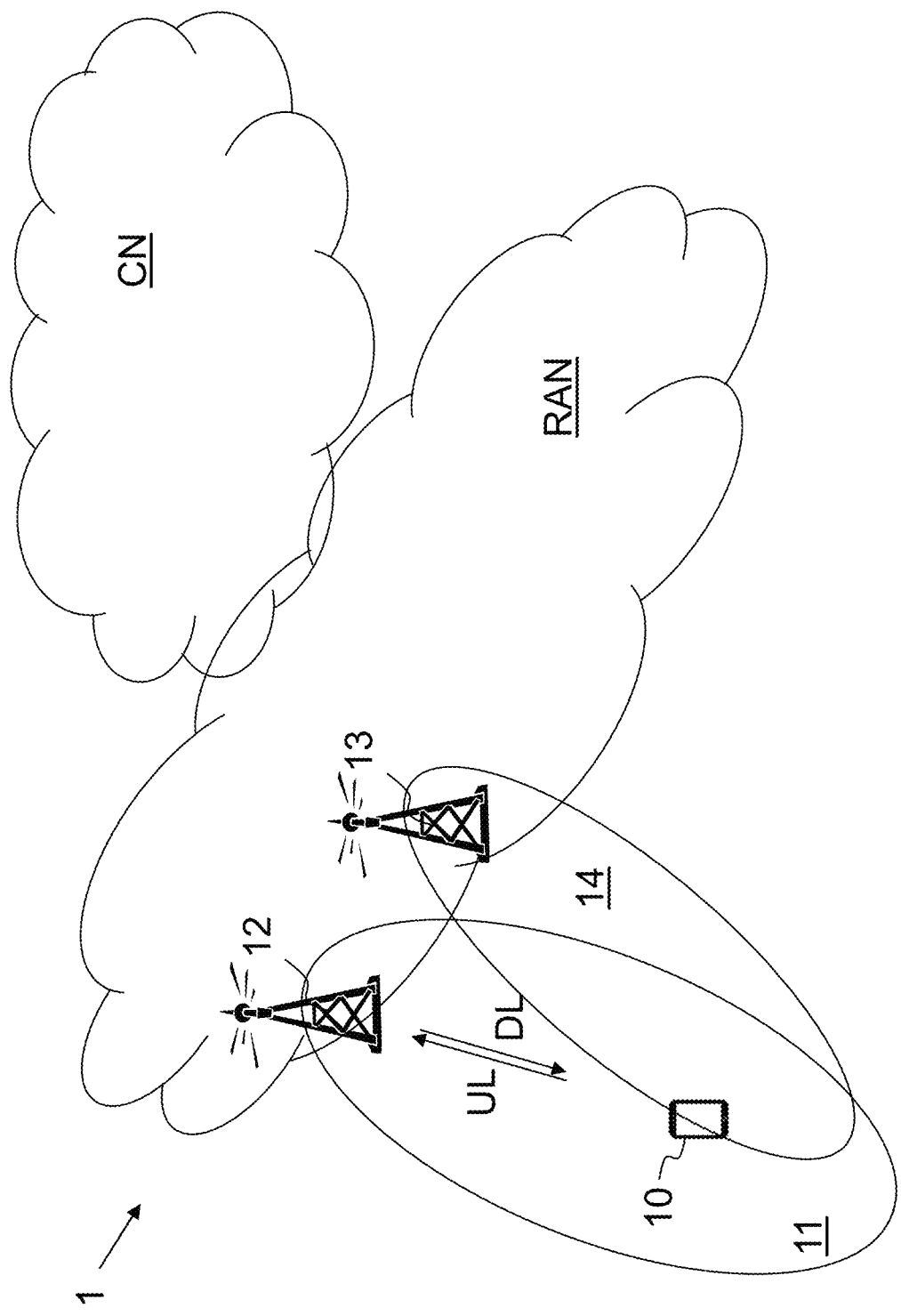
FIG. 2a is a schematic overview depicting a wireless communication network according to embodiments herein.

Embodiments herein relate to wireless communication networks in general. FIG. 2a is a schematic overview depicting a wireless communication network 1. The wireless communication network 1 comprises one or more RANs and one or more CNs. The wireless communication network 1 may use one or a number of different technologies, such as Wi-Fi™, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMAX™), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first cell 11 or first service area, of a radio access technology (RAT), such as LTE, Wi-Fi™, WiMAX™ or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the first radio network node 12 depending e.g. on the radio access technology and terminology used. The first radio network node 12 may alternatively or additionally be a controller node or a packet processing node such as a radio controller node or similar. The first radio network node 12 may be referred to as the first radio network node or as a primary serving network node wherein the first cell 11 may be referred to as a primary serving cell or primary cell, and the primary serving network node 12 communicates with the UE 10 in form of DL transmissions to the UE 10 and UL transmissions from the UE 10.

The wireless communication network 1 comprises a second radio network node 13 providing radio coverage over a geographical area, a second cell 14 or a second service area, of a radio access technology (RAT), such as LTE, Wi-Fi™, WiMAX™ or similar. The second radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the second radio network node 13 depending e.g. on the radio access technology and terminology used. The second radio network node 13 may alternatively or additionally be a controller node or a packet processing node such as a radio controller node or similar. The second radio network node 13 may be referred to as a secondary serving network node wherein the second cell 14 may be referred to as a secondary serving cell or secondary cell, and the secondary serving network node 13 communicates with the UE 10 in form of DL transmissions to the UE 10 and UL transmissions from the UE 10.

It should be noted that a cell may be denoted as service area, beam, beam group or similar to define an area of radio coverage. The radio network nodes may transmit reference signals (RS), e.g. paging signal such as WUS to wake up the UE 10 from a dormant state.

According to embodiments herein, the first 12 or the second 13 radio network node transmits a wake-up signal (WUS) e.g. a reference signal or a paging signal, with a multibit indication. The multibit indication comprises a first bit indicating to start or not to start, for a first cell, an on-duration timer at one or more of the next occurrence of an on-duration, and a second bit indicating to apply dormancy or non-dormancy behavior on a second cell at the next occurrence of an on-duration for the second cell. The multibit indication indicates whether the wake-up signal is for a first cell, e.g. a first serving cell such as a primary cell, or a second cell, e.g. a secondary serving cell such as a secondary cell. The UE 10 receives the multibit indication and performs an action, e.g. initiate a timer for being on-duration, based on the multibit indication.

Note that in a general scenario the term "radio network node" can be substituted with "transmission point". Distinction between the transmission points (TPs) may typically be based on CRSs or different synchronization signals transmitted. Several TPs may be logically connected to the same radio network node, but if they are geographically separated, or are pointing in different propagation directions, the TPs may be subject to the same mobility issues as different radio network nodes. In subsequent sections, the terms "radio network node" and "TP" can be thought of as interchangeable.

Figure 2B:
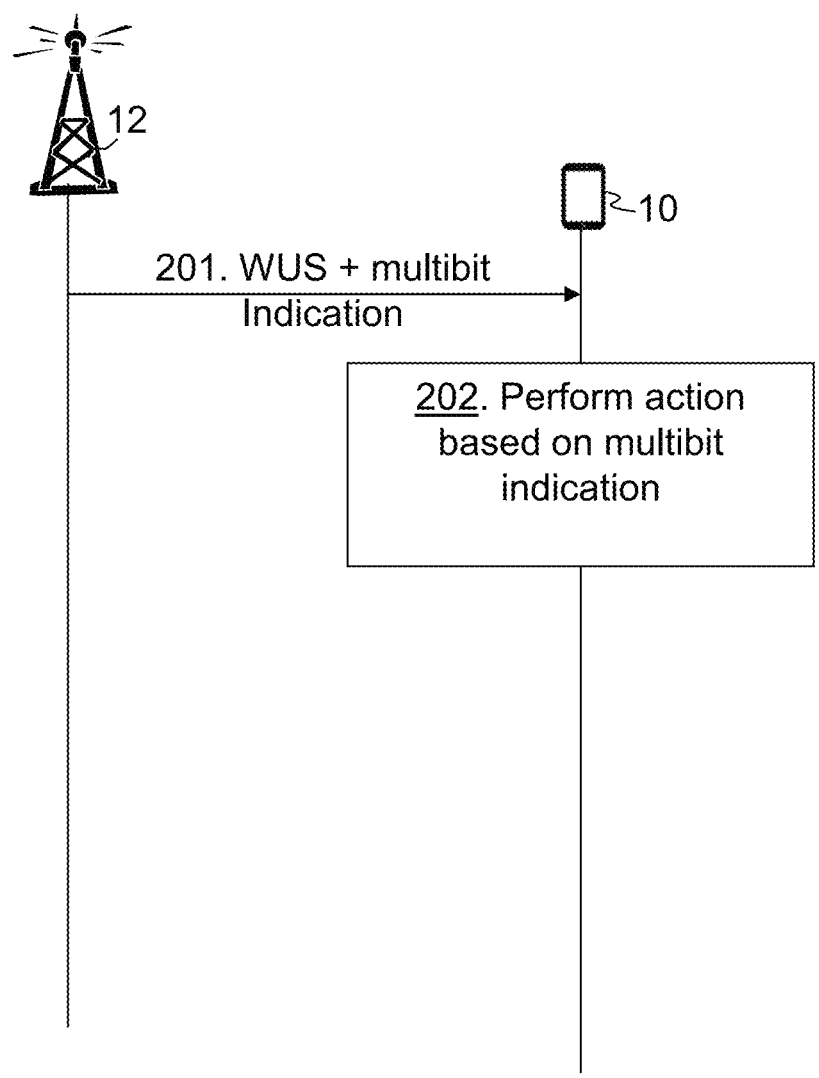
FIG. 2b is a combined signalling scheme and flowchart according to embodiments herein.

FIG. 2b is a combined flowchart and signalling scheme according to embodiments herein. The actions may be performed in any suitable order.

Action 201. The first radio network node 12 (or the second radio network node 13) transmits the WUS to the UE with the multibit indication, wherein the multibit indication comprises the first bit indicating to start or not to start, for the first cell 11, an on-duration timer at one or more of the next occurrence of an on-duration, and the second bit indicating to apply dormancy or non-dormancy behavior on the second cell 14 at the next occurrence of an on-duration for the second cell.

Action 202. The UE 10 receives the WUS and the indication and behaves based on the received indication. E.g., the UE 10 starts a timer for on-duration for the first cell 11 if the WUS is for the first cell 11 and/or apply dormancy behavior on the second cell 14 if the WUS is further for second cell 14.

Figure 2C:
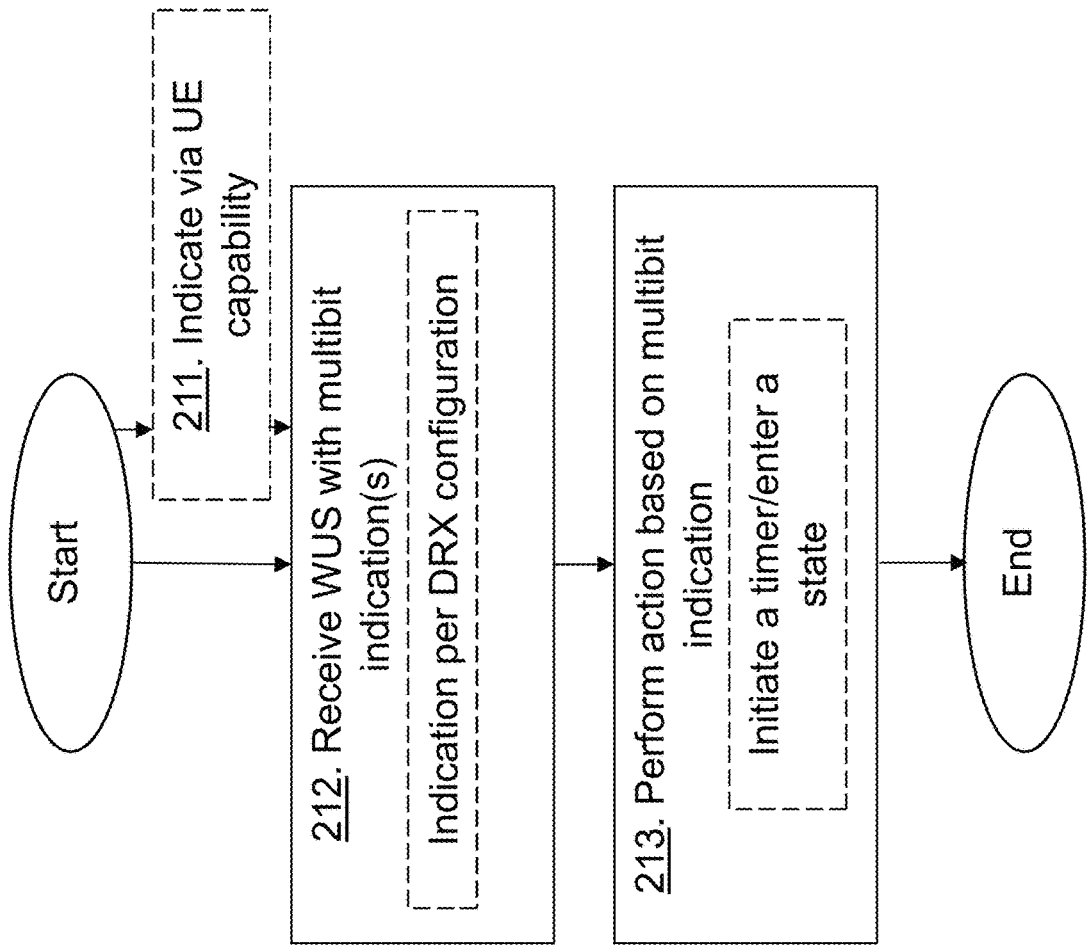
FIG. 2c is a flowchart depicting a method performed by a UE according to embodiments herein.

The method actions performed by the UE 10 for communicating in the wireless communication network according to embodiments herein will now be described with reference to a flowchart depicted in FIG. 2c. The actions do not have to be taken in the order stated below, but may be taken in any suitable order. Actions performed in some embodiments are marked with dashed boxes.

Action 211. The UE 10 may indicate via UE capability signalling whether it supports Scell grouping in WUS on a per-band, per-frequency range, or per carrier basis, e.g. supports SCell grouping in Downlink control indicator (DCI) format monitored outside Active time.

Action 212. The UE 10 receives the wake-up signal with the multibit indication, wherein the multibit indication comprises the first bit indicating to start or not to start, for the first cell, an on-duration timer at one or more of the next occurrence of an on-duration, and the second bit indicating to apply dormancy or non-dormancy behavior on the second cell at the next occurrence of an on-duration for the second cell. Thus the multibit indication may be an indication that indicates whether the wake-up signal is for the first cell, or the second cell. Thus, the UE 10 is in connected mode, whereby the radio network node 12 is already connected to the UE 10, and the radio network node sends the WUS or the PDCCH to wake-up/not-wake up UE based on traffic burst arrival/absence. The UE 10 may receive the wake-up signal by monitoring a downlink control indicator (DCI) format based on PDCCH outside active time. The wake-up signal may comprise a separate indication per discontinuous reception (DRX) configuration to inform whether to start or not an on-duration timer for the corresponding DRX configuration. The first cell may be a primary cell, and the second cell may be a secondary cell. The multibit indication may comprise a first bit affecting a timer related to change of state of the UE 10 based on which PDCCH monitoring is adjusted on first cell and a second cell; and a second bit adjusting the PDCCH monitoring or bandwidth part used only for the second cell.

Action 213. The UE 10 performs an action related to the wake-up signal taking the received multibit indication into account. The action may comprise, e.g., initiating a timer or not based on the multibit indication and/or entering a state or not based on the multibit indication. The timer may relate to entering dormancy state or coming out from dormancy state. The UE 10 may e.g. stay in DRX, when the on-duration timer is not started, and when in DRX, stop PDCCH monitoring on the first cell and the second cell, and stop CSI measurement and reporting for the first cell and the second cell. When dormancy behaviour is indicated, the UE 10 may stop PDCCH monitoring on the second cell and continue CSI measurements and reporting for the second cell. When dormancy behaviour is indicated, the UE 10 may switch to a Bandwidth part (BWP) with no PDCCH monitoring on the second cell.

In other words:

It is herein disclosed e.g. a method performed by the UE 10 that is configured with one or more serving cells and is configured with DRX, for communicating in a wireless communication network. The UE 10 may monitor a DCI format, i.e. the WUS signal, outside Active time, the DCI format having one or more fields, i.e. the indication(s), indicating information related to one or more serving cells. The UE 10 may detect a DCI format outside active time, and may perform the action which may be one or more of the following actions: a first action associated with DRX functionality based on a value of a first bit in the detected DCI format, and a second action on the one or group of SCells based on a second bit in the detected DCI format corresponding to the one SCell or the group of SCells. The first action may be to start or not start an on-duration timer at the next occurrence of on-duration based on the value of a first bit in the detected DCI format. The second action may be to apply dormancy behaviour or non-dormancy behaviour based on the value of a second bit in the detected DCI format corresponding to one SCell or group of SCells. The on-duration timer may be started at next on-duration instance according to DRX pattern if the first bit indicates 'wake-up' or 'On'. The dormancy behaviour may be applied for one or group of SCells if the second bit indicates 'Off'. The dormancy behaviour may imply switching to a BWP on the Scell or group of SCells with no PDCCH monitoring. The UE 10 may perform a third action on another SCell or another group of SCells based on a third bit in the detected DCI format corresponding to another SCell or the another group of SCells.

Alternatively, it is herein disclosed a method performed by the UE 10 that is configured with one or more serving cells and is configured with DRX, for communicating in the wireless communication network. The UE 10 may receive configuration information, with multiple DRX configurations, with one DRX configuration per group of cells, and may monitor a DCI format, i.e. the WUS signal, outside Active time, the DCI format having one or more fields i.e. indications, each field indicating information related to DRX configuration for a group of cells. The UE 10 may detect a DCI format outside active time, and may perform the following actions: a first action associated with DRX functionality based on a value of a first bit in the detected DCI format for the first group of cells, and a second action associated with DRX functionality based on a value of a second bit in the detected DCI format for a second group of cells. The first action may be to start or not start an on-duration timer at the next occurrence of on-duration based on the value of a first bit in the detected DCI format for the first DRX configuration. The second action may be to start or not start an on-duration timer at the next occurrence of on-duration based on the value of a second bit in the detected DCI format for the second DRX configuration. The on-duration timer may be started at next on-duration instance according to DRX pattern if the first bit indicates 'wake-up' or 'On'. The on-duration timer may be started at next on-duration instance according to DRX pattern if the second bit indicates 'wake-up' or 'On'. The first group of cells may belong to frequency range 1 and have a first DRX configuration, and the second group of cells may belong to frequency range 2 and have a second DRX configuration. If a first group of cells is in DRX, and a second group of cells is in active time, the UE 10 may receive an indication on the second group of cells to bring the UE 10 out of DRX in the first group of cells. The indication may be a MAC message.

Figure 2D:
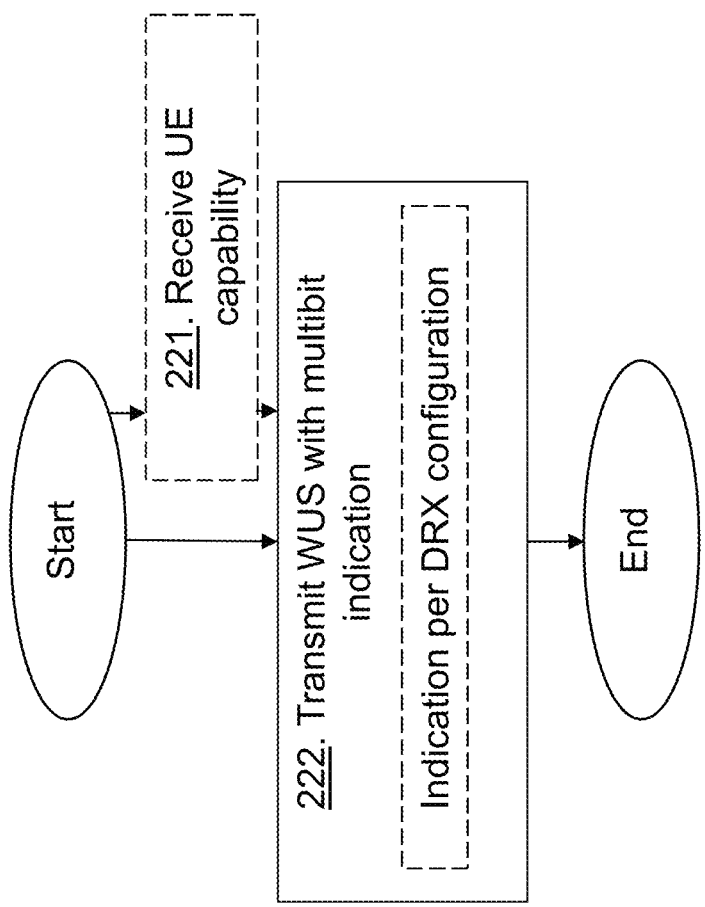
FIG. 2d is a flowchart depicting a method performed by a radio network node according to embodiments herein.

The method actions performed by the first radio network node 12 for handling communication of the UE in the wireless communication network according to embodiments herein will now be described with reference to a flowchart depicted in FIG. 2d. The actions do not have to be taken in the order stated below, but may be taken in any suitable order. Actions performed in some embodiments are marked with dashed boxes.

Action 221. The first radio network node 12 may receive via UE capability signalling whether the UE 10 supports Scell grouping in WUS on a per-band, per-frequency range, or per carrier basis, e.g. supports SCell grouping in DCI format monitored outside Active time.

Action 222. The first radio network node 12 transmits the wake-up signal with the multibit indication to the UE 10. The multibit indication comprises the first bit indicating to start or not to start, for the first cell, the on-duration timer at one or more of the next occurrence of an on-duration, and the second bit indicating to apply dormancy or non-dormancy behavior on the second cell at the next occurrence of an on-duration for the second cell. Thus, the multibit indication indicates whether the wake-up signal is for a first cell or a second cell. The wake-up signal may comprise a separate indication per DRX configuration to inform whether to start or not an on-duration timer for the corresponding DRX configuration. The first cell may be a primary cell, and the second cell may be a secondary cell. The indication may be related to initiating a timer or not based on the multibit indication and/or entering a state or not based on the multibit indication. The timer may relate to entering dormancy state or coming out from dormancy state. The multibit indication may comprise a first bit affecting a timer related to change of state of the UE based on which PDCCH monitoring is adjusted on a first cell and a second cell; and a second bit adjusting the PDCCH monitoring or bandwidth part used only for the second cell.

Figure 3A:
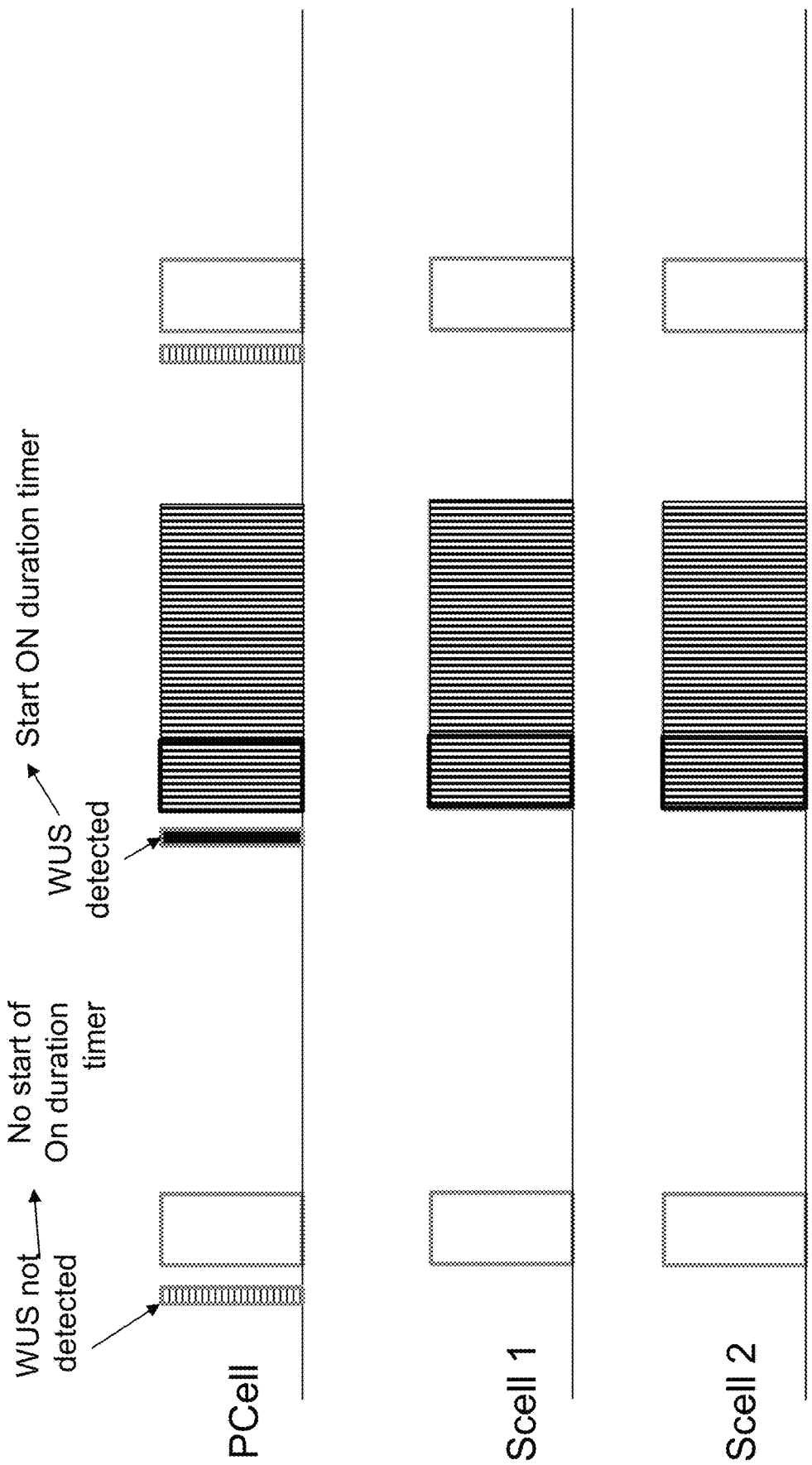
FIGS. 3a-3e are schematic overviews of transmissions of WUSs.

FIG. 3a illustrates how to behave for Scells based on an indication received. The FIG. 3a shows a basic WUS operation for a UE configured with DRX and three serving cells. In this example, there is only 1-bit indication or a single wake-up indication for all cells. When the UE 10 detects a wake-up signal outside Active time and before an on-duration, the UE 10 may start the corresponding on-duration timer at the next on-duration occasion, and may monitor PDCCH in the corresponding on-duration and in Active time (if it receives scheduling messages). If the UE 10 does not detect a wake-up signal outside Active time and before an on-duration, the UE 10 may not start the corresponding on-duration timer at the next on-duration occasion, i.e. not monitor PDCCH in the corresponding on-duration.

If separate Scell indication in WUS is to be supported, then the corresponding UE behavior and procedures need to be specified. It is also desirable to ensure that the wake-up signaling mechanism can work with dormancy (or dormancy-like) behavior for Scells. Dormancy-like can mean sparse/no PDCCH monitoring on activated Scell while maintaining CSI measurements/reporting.

Scell Indication in WUS and UE Behavior.

The UE 10 is configured with one or more serving cells. The UE 10 may further be configured with DRX, which includes e.g. an on-duration timer configuration, an inactivity timer configuration. The UE 10 is configured to monitor a downlink control indicator (DCI) format in a wake-up signal, e.g. based on PDCCH outside Active time. The DCI format may have one or more fields, i.e. bits, indicating information related to one or more serving cells.

In an example, the DCI may have multiple bits, with at least 1 bit corresponding to a Pcell and one or more bit(s) corresponding to one or more Scells. A first bit corresponding to PCell indicates whether to start (or not start) a timer (e.g. on-duration timer) at one or more of the next occurrence of on-duration. A second bit corresponding to an Scell (or a group of Scells) may indicate whether the UE 10 applies dormancy behavior on the Scell (or group of Scells) or not apply dormancy behavior on the Scell (or group of Scells) at the next occurrence of on-duration.

The indication, such as a bit in WUS corresponding to a first cell, may affect a timer related to change of state of the UE 10 such as the on-duration timer, based on which PDCCH monitoring is adjusted on a first cell and a second cell; and a second bit in the WUS corresponding to a second cell may not affect the start of an on-duration timer, but instead may adjust the PDCCH monitoring (or bandwidth part (BWP) used) only for the second cell. The first cell may be a PCell or a Primary secondary cell (PScell). The second cell may be an Scell.

If an indication, such as the bit corresponding to a PCell, indicates the UE 10 to start the on-duration timer, and if a second indication, such as second bit corresponding to an Scell, is set to a first value (e.g. 0), then the UE 10 may go to dormancy behavior for that Scell. The UE 10 may go to dormancy behavior for the Scell at the start of the on-duration timer.

If the bit corresponding to PCell indicates the UE 10 to start the on-duration timer, and if the bit corresponding to an Scell is set to a second value (e.g. 1), then the UE 10 may go to non-dormancy behavior for that Scell. The UE 10 may go to non-dormancy behavior for the Scell at the start of the on-duration timer.

The UE 10 may be configured with a Pcell and one or more Scells, and the UE 10 may be configured with DRX pattern. The UE 10 may be configured with WUS with the indication corresponding to the Pcell and the one or more Scells.

For the Pcell, if the indication indicates 'wake-up', the UE may start the on-duration timer at the next on-duration instance according to DRX pattern; otherwise the UE 10 may not start the on-duration timer. For the Scell, if the indication indicates 'wake-up', the UE 10 may apply corresponding actions of dormancy indicator wake-up; otherwise the UE 10 may apply corresponding actions of dormancy indicator sleep.

The second bit, such as a dormancy indicator Wake-up, may indicate the UE 10 to go to BWPx if multiple BWPs are configured. The dormancy indicator Wake-up may indicate to the UE 10, to start monitoring PDCCH (or PDCCH on) if one BWP is configured. The second bit such as a dormancy indicator Sleep may indicate to the UE 10 to go to BWPy if multiple BWPs are configured. The dormancy indicator Sleep may indicate the UE 10 to stop monitoring PDCCH (or PDCCH off) if one BWP is configured.

For the UE 10 being configured with dual connectivity, the above principle can be applied on a per cell group with corresponding DRX patterns and WUS.

For the master cell group (MCG), the principle may be applied for PCell and Scells belonging to the MCG.

For the secondary cell group (SCG), the principle may be applied for PSCell (or the PCell for the SCG) and Scells belonging to the SCG.

A tabular example is shown below:

TABLE 1

Table illustrating UE behavior for example Scell indication in WUS

| Pcell indication in WUS | Scell indication in WUS | UE behavior |
|---|---|---|
| on | on | Monitor PDCCH on PCell Monitor PDCCH on SCells assuming non-dormancy behavior |
| on | off | Monitor PDCCH on PCell Monitor PDCCH on SCells assuming dormancy behavior |
| off | on | Don't start OnDurationTimer, i.e., stay in DRX on all cells |
| off | off | Don't start OnDurationTimer, i.e., stay in DRX on all cells |

Dormancy behavior above may imply one or more of the following
Stop monitoring PDCCH on the Scell (e.g. if only one BWP is configured for the UE)
Switch to a specific BWP on the Scell (e.g. if more than on BWP configured for the Scell, then switch to BWP with no/sparse PDCCH monitoring)
Measure/report CSI with a relaxed timing (i.e., more latency between CSI trigger and corresponding report) compared to non-dormancy.
Non-dormancy behavior above may imply one or more of the following
Monitor PDCCH on the Scell (e.g. if only one BWP is configured for the UE)
Switch to a specific BWP on the Scell (e.g. if more than on BWP configured for the Scell, then switch to BWP with PDCCH monitoring)
Measure/report CSI with a regular timing (i.e., less delay between CSI trigger and corresponding report) compared to dormancy.

When dormancy behavior is applied for an Scell, the UE 10 may stop PDCCHmonitoring or change BWP for the Scell, but the UE 10 may continue CSI measurements/reporting for the Scell.

When the on-duration timer for an on-duration is not started, the UE 10 may skip that on-duration and may stay in DRX. When in DRX, the UE may stop PDCCH monitoring on PCell and all the Scells, and the UE 10 may also not measure/report CSI for the Pcell and all the Scells.

There can be one bit per Scell in WUS. Alternately, the same principle can be applied to groups of Scells, i.e. groups of Scells can be transitioned to dormancy or non-dormancy behavior. In one example, there is only one cell in one group (Pcell), and all Scells are in a second group.

The UE 10 may indicate via UE capability and/or assistance signaling if it supports Scell grouping in WUS on a per-band, per-frequency range, or per carrier basis. This may allow the UE 10 to indicate its preference for power savings, e.g. to avoid cases where dormancy behavior may not be beneficial.

Figure 3B:
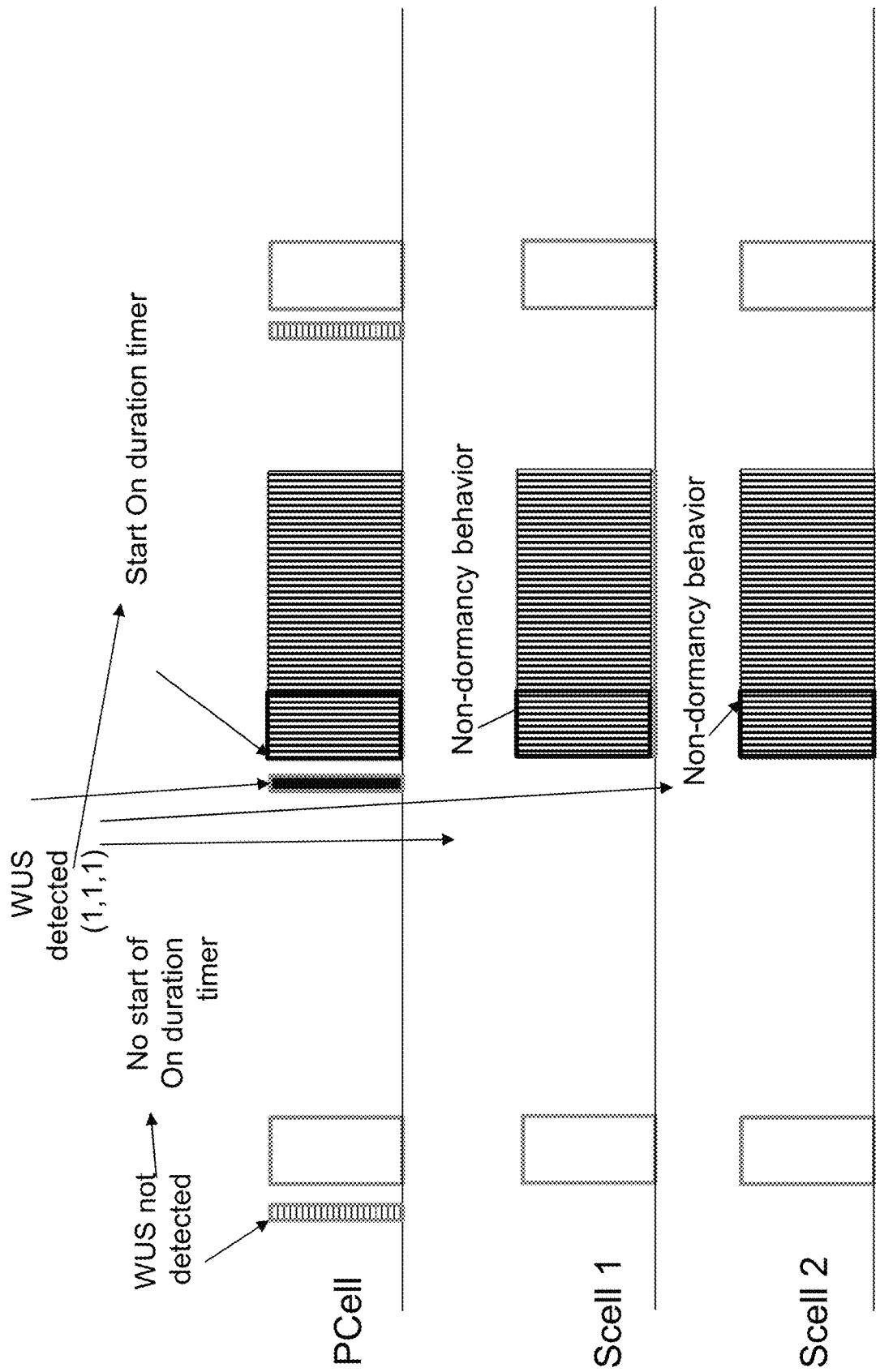

FIG. 3b shows an example with multi-bit indication in WUS. When WUS is not detected, the on-duration timer is not started. When WUS is detected, and the bit corresponding to Pcell (e.g. first bit in the indication) will indicate to the UE 10 to start the corresponding on-duration timer. The bit corresponding to Scell 1 (e.g. 2nd bit in the indication set to 1) may indicate the UE 10 to go to non-dormancy behavior at the beginning of the on-duration. The bit corresponding to Scell 2, e.g. 3rd bit in the indication set to 1, may indicate to the UE 10 to go to non-dormancy behavior at the beginning of the on-duration.

Figure 3C:
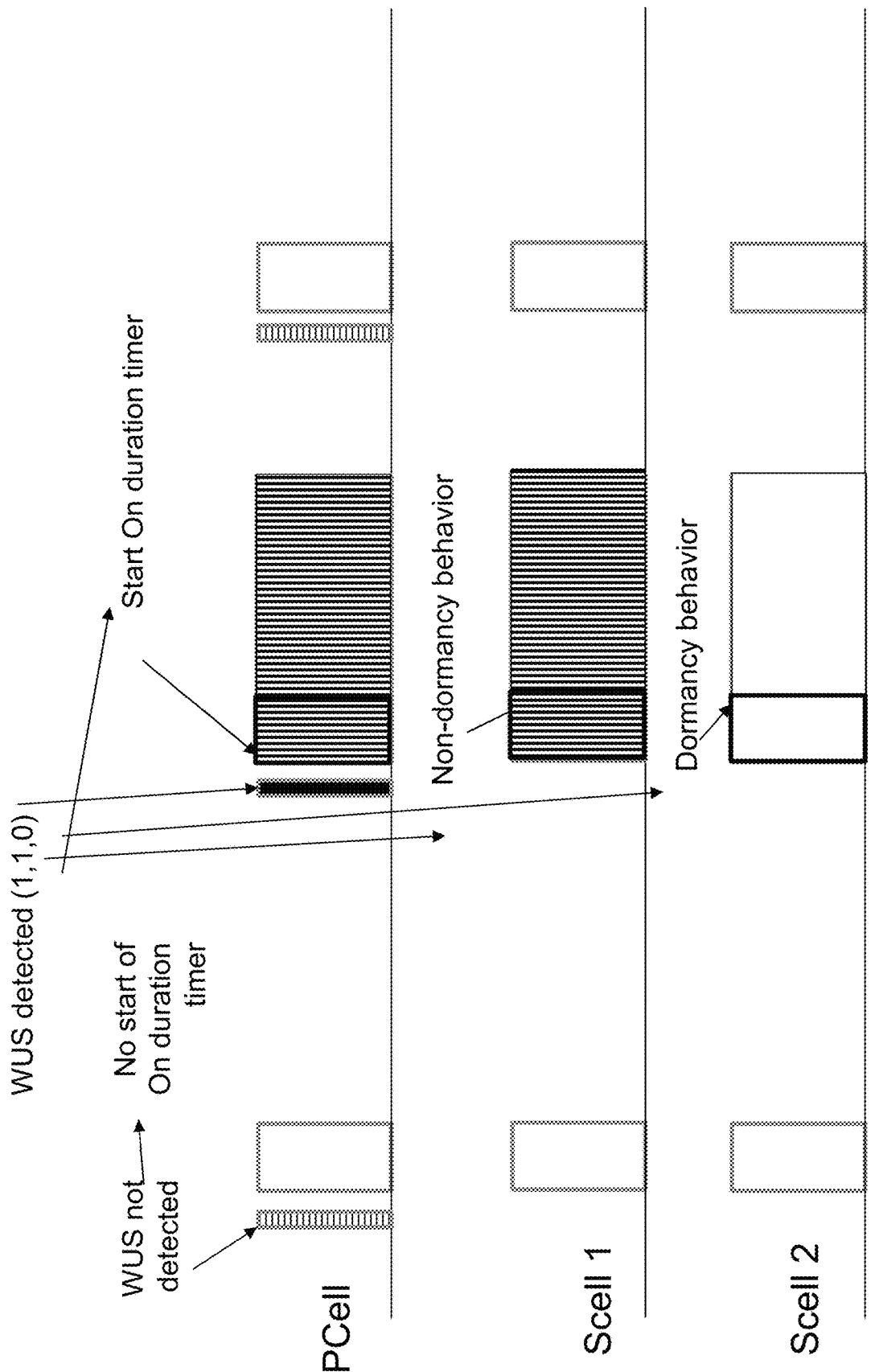

FIG. 3c shows an example with multi-bit indication in WUS. When WUS is not detected, the on-duration timer is not started. When WUS is detected, and the bit corresponding to Pcell (e.g. first bit in the indication set to 1) may indicate the UE 10 to start the corresponding on-duration timer. The bit corresponding to Scell 1 (e.g. 2nd bit in the indication set to 1) may indicate to the UE 10 to go to non-dormancy behavior at the beginning of the on-duration. The bit corresponding to Scell 2 (e.g. 3rd bit in the indication set to 0) may indicate to the UE 10 to go to dormancy behavior at the beginning of the on-duration. When Active time ends, the UE 10 may go to DRX on all cells.

Figure 3D:
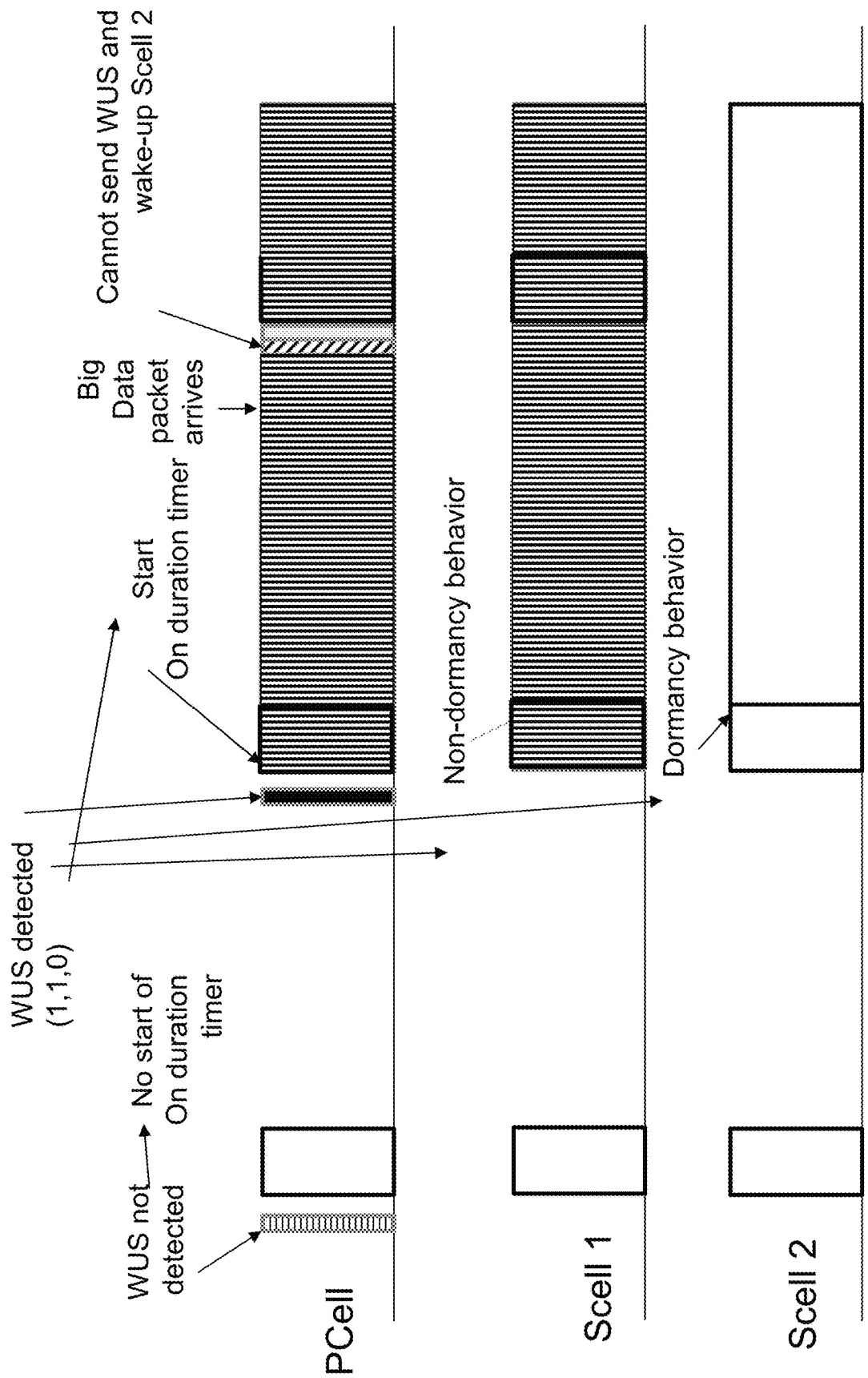

FIG. 3d shows an example with multi-bit indication in WUS and illustrates an issue with having dormancy indication only in WUS. When WUS is not detected, the on-duration timer is not started. When WUS is detected, and the bit corresponding to Pcell (e.g. first bit in the indication set to 1) may indicate to the UE 10 to start the corresponding on-duration timer. The bit corresponding to Scell 1 (e.g. 2nd bit in the indication set to 1) may indicate to the UE 10 to go to non-dormancy behavior at the beginning of the on-duration. The bit corresponding to Scell 2 (e.g. 3rd bit in the indication set to 0) may indicate to the UE 10 to go to dormancy behavior at the beginning of the on-duration. If a big packet arrives during active time, the UE 10 may not monitor the WUS, and hence there would be no way of indicating transitioning from dormancy to non-dormancy on the Scell 2.

Figure 3E:
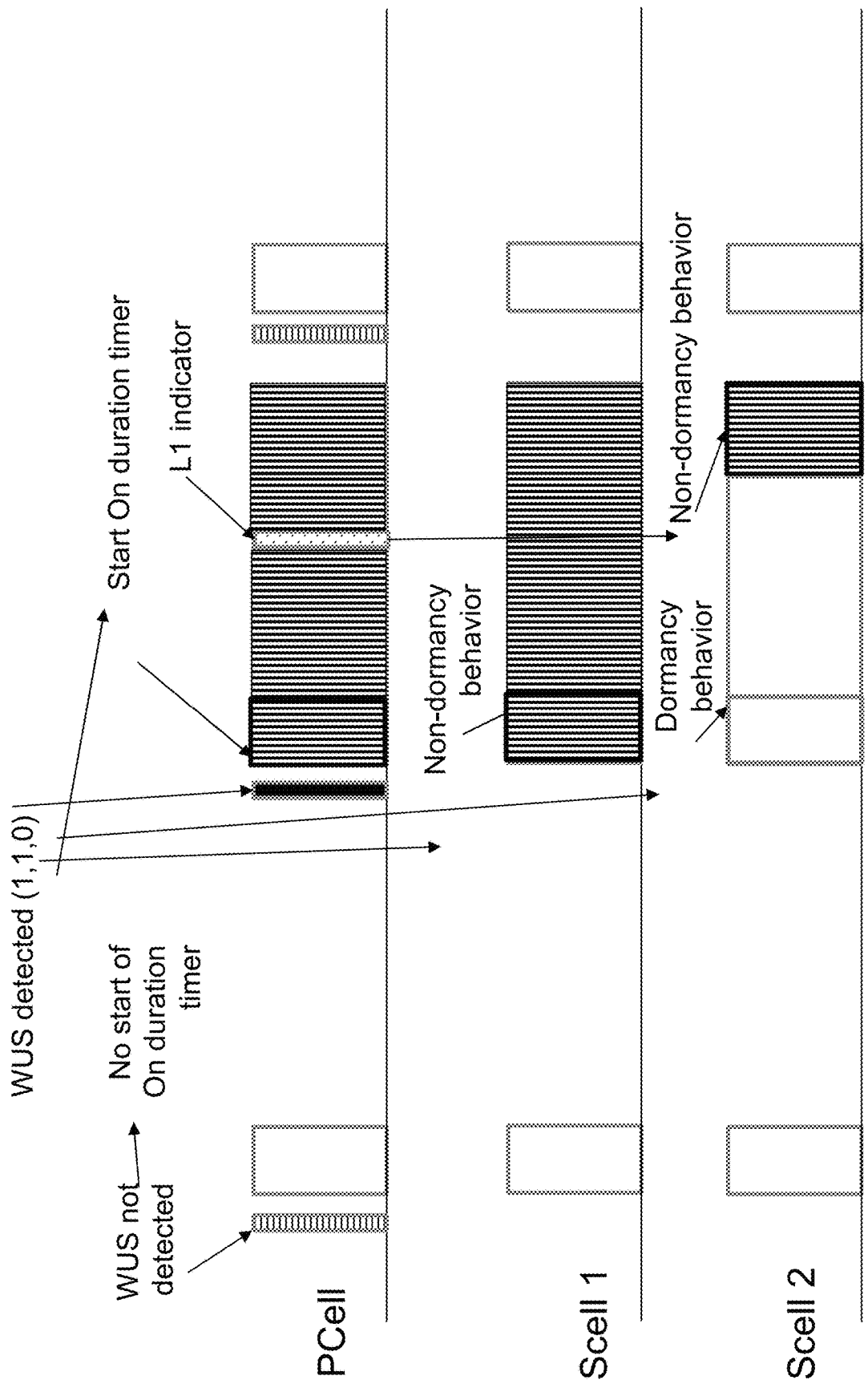

FIG. 3e shows an example with multi-bit indication in the WUS and how to resolve the issue (shown in FIG. 3d) with having dormancy indication only in WUS. When WUS is not detected, the on-duration timer is not started. When WUS is detected, and the bit corresponding to Pcell (e.g. first bit in the indication set to 1) will indicate to the UE 10 to start the corresponding on-duration timer. The bit corresponding to Scell 1 (e.g. $2^{nd}$ bit in the indication set to 1) may indicate to the UE 10 to go to non-dormancy behavior at the beginning of the on-duration. The bit corresponding to Scell 2 (e.g. $3^{rd}$ bit in the indication set to 0) may indicate to the UE 10 to go to dormancy behavior at the beginning of the on-duration. If a big packet arrives during active time, the UE 10 may not monitor the WUS, and hence an L1 indication (to transition between dormancy and non-dormancy behavior on Scells) may be used to transition from dormancy to non-dormancy on the Scell 2.

When Active time ends, the UE 10 may go to DRX on all cells.

Timer-Based Mechanism to Complement L1-Based Indication for Transitioning Between Dormancy and Non-Dormancy Behavior.

Timer based dormancy to non-dormancy behavior may also be specified as an enhancement to L1-based indication for transitioning between dormancy and non-dormancy behavior. The timer can reduce the need for a network (NW) to send L1-based commands to the UE 10 (e.g. to transition to dormancy behavior), especially in cases of high load on the control channels.

The UE 10 may be configured with a timer value, for transitioning between dormancy and non-dormancy behavior.

In one example, the timer may be used to transition to dormancy behavior. If L1 indicates On (or transition to non-dormancy behavior), the UE 10 may start a timer and stays in non-dormancy behavior until the timer expires; the UE 10 may further go to dormancy behavior upon timer expiry.

In another example, a timer can be used to transition to non-dormancy behavior. If L1 indicates Off (or transition to dormancy behavior), the UE 10 may start a timer and stays in dormancy behavior until the timer expires, the UE 10 may go to non-dormancy behavior upon timer expiry.

If the DRX inactivity timer expires, or at the start of on-duration timer, the UE 10 may start in a pre-determined behavior (dormancy or non-dormancy) for one or more Scells. The pre-determined behavior may be configured by higher layers or indicated by MAC CE.

In another mechanism (to resolve the issue from FIG. 3d), if the UE 10 is in Active time, and is unable to monitor WUS, then one way to bring back Scell 2 from dormancy is to tie conditions together—a Dormancy timer begins at the beginning of the on-duration for Scell 2, and if the UE 10 is in active time and dormancy timer for Scell 2 expires, then the corresponding Scell 2 transitions to non-dormancy.

Handling multiple DRX configurations with WUS and fast transitions out of DRX.

The UE 10 may be configured with multiple DRX configurations, one per group of cells. For example, frequency range 1 (FR1) cells have DRX configuration 1, and frequency range 2 (FR2) cells have DRX configuration 2. Assume for sake of illustration, that the DRX on-durations (and DRX cycles) are overlapping at least partially. Then, such a design allows using a single WUS mechanism to wake up both groups of cells.

If the UE 10 is configured with multiple DRX configurations, the WUS may contain separate indications, e.g., one indication per DRX configuration to inform whether to start (or not) on-duration timer for the corresponding DRX configuration. The indication may also indicate whether the corresponding on-duration timer may be started. The indication may also and further indicate one of dormancy or non-dormancy behavior.

If a first group of cells is sleeping (or is in DRX), and second group of cells is in active time, an indication on the second group of cells can be sent to the UE 10 to come out of DRX in the first group of cells. Bringing the UE 10 out of DRX may not be same as bringing the UE 10 out of dormancy. MAC-based wake-up or MAC based bring back of groups of cells that are sleeping may be used.

When the UE 10 is configured with multiple DRX configurations, and the on-duration timer for an on-duration corresponding to a DRX configuration is not started, the UE 10 may skip that on-duration and may stay in DRX for the group of cells associated with the DRX configuration. When in DRX, the UE 10 may stop PDCCH monitoring on all the serving cells associated with the DRX configuration, and the UE 10 may also not measure/report CSI for the serving cells associated with the DRX configuration.

With the reception of the indication, in one example, an Inactivity timer is started in the first group of cells. To allow the UE 10 to come out of DRX on the first group of cells, a transition time may be specified before the inter arrival time (IAT) timer may be started for that group of cells. Alternatively, with the reception of the indication, the UE 10 is expected to wake up at the next instance of on-duration regardless of whether the UE 10 detects a WUS or not in the corresponding monitoring occasion.

FIG. 4 is a block diagram depicting the UE 10 for communicating in the wireless communication network 1 such as handling communication e.g. handling or enabling paging from the first radio network node 12 and the second radio network node 13 in the wireless communication network 1 according to embodiments herein.

The UE 10 may comprise processing circuitry 801, e.g. one or more processors, configured to perform the methods herein.

The UE 10 may comprise a receiving unit 802, e.g. a receiver or a transceiver. The UE 10, the processing circuitry 801, and/or the receiving unit 802 is configured to receive the WUS with the multibit indication from the radio network node such as the first 12 or the second network node 13, wherein the multibit indication comprises the first bit indicating to start or not to start, for the first cell, the on-duration timer at one or more of the next occurrence of the on-duration, and the second bit indicating to apply dormancy or non-dormancy behavior on the second cell at the next occurrence of the on-duration for the second cell. The wake-up signal may comprise a separate indication per DRX configuration to inform whether to start or not an on-duration timer for the corresponding DRX configuration. The first cell may be a primary cell, and the second cell may be a secondary cell.

The UE 10 may comprise a performing unit 803. The UE 10, the processing circuitry 801, and/or the performing unit 803 is configured to perform an action related to the wake-up signal taking the received multibit indication into account such as initiating a timer or not based on the indication. The action may comprise initiating a timer or not based on the multibit indication and/or entering a state or not based on the multibit indication. The timer may relate to entering dormancy state or coming out from dormancy state. The indication may be a multibit indication comprising the first bit affecting the timer related to change of state of the UE 10 based on which PDCCH monitoring is adjusted on the first cell and the second cell; and the second bit adjusting the PDCCH monitoring or bandwidth part used only for the second cell. The UE 10, the processing circuitry 801, and/or the performing unit 803 may be configured to stay in DRX, when the on-duration timer is not started, and when in DRX, configured to stop PDCCH monitoring on the first cell and the second cell, and to stop CSI measurement and reporting for the first cell and the second cell. The UE 10, the processing circuitry 801, and/or the performing unit 803 may be configured to, when dormancy behaviour is indicated, stop PDCCH monitoring on the second cell and to continue CSI measurements and reporting for the second cell. The UE 10, the processing circuitry 801, and/or the performing unit 803 may be configured to, when dormancy behaviour is indicated, switch to a BWP with no PDCCH monitoring on the second cell. The UE 10, the processing circuitry 801, and/or the receiving unit 802 may be configured to receive the wake-up signal by monitoring the DCI format based on PDCCH outside active time.

The UE 10 further comprises a memory 807. The memory comprises one or more units to be used to store data on, such as indications, WUSs, RSs, strengths or qualities, UL grants, indications, requests, commands, timers, applications to perform the methods disclosed herein when being executed, and similar. The UE 10 comprises a communication interface comprising one or more antennas.

The methods according to the embodiments described herein for the UE 10 are respectively implemented by means of e.g. a computer program product 805 or a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

Figure 5:
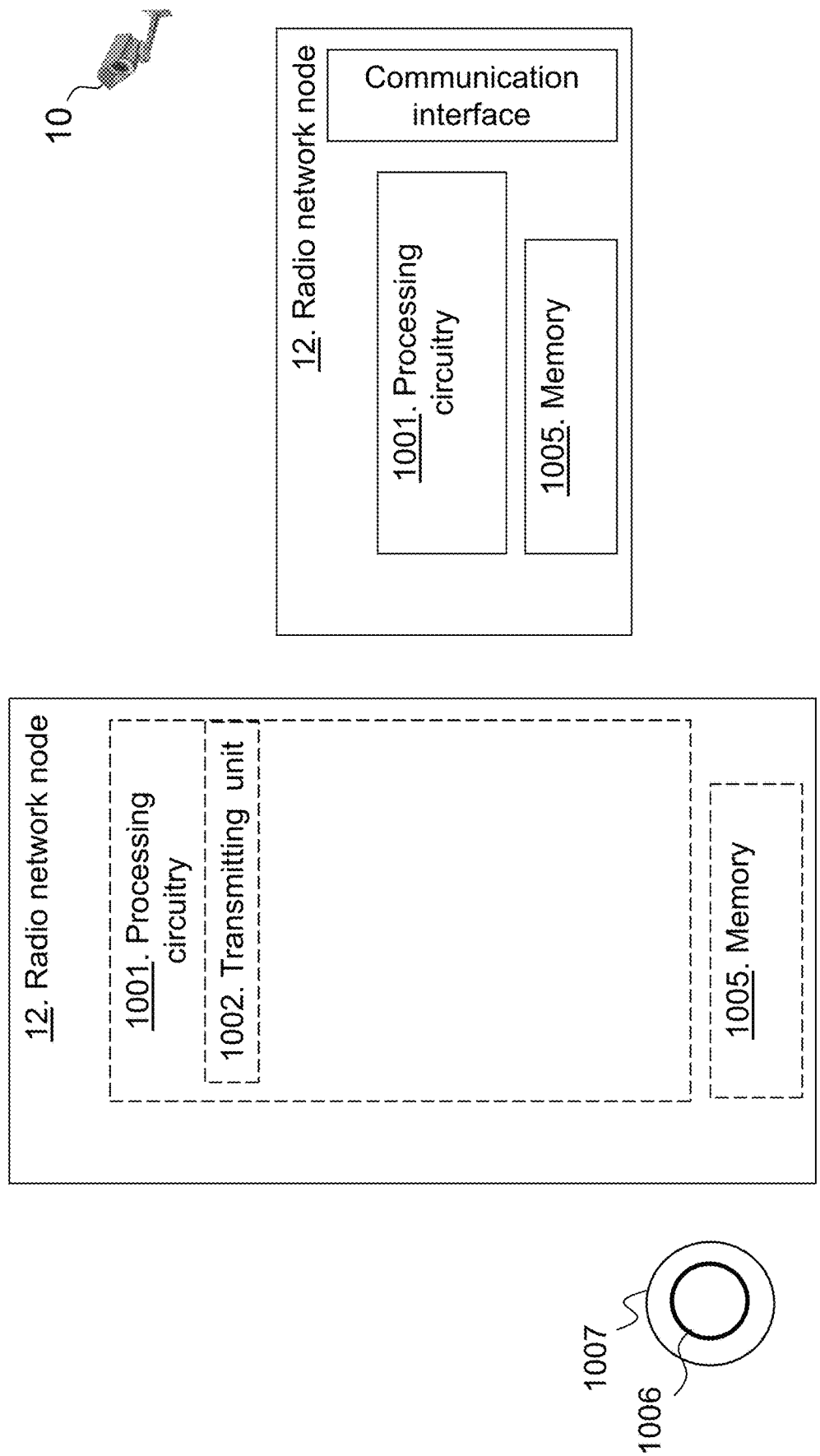
FIG. 5 is a block diagram depicting a radio network node according to embodiments herein.

FIG. 5 is a block diagram depicting the radio network node 12 for handling communication of the UE 10 in the wireless communication network 1, e.g. facilitating, configuration in the wireless communication network 1 according to embodiments herein.

The radio network node 12 may comprise processing circuitry 1001, e.g. one or more processors, configured to perform the methods herein.

The radio network node 12 may comprise a transmitting unit 1002. The radio network node 12, the processing circuitry 1001 and/or the transmitting unit 1002 is configured to transmit, to the UE 10, the WUS with the multibit indication, wherein the multibit indication comprises the first bit indicating to start or not to start, for the first cell, the on-duration timer at one or more of the next occurrence of the on-duration, and the second bit indicating to apply dormancy or non-dormancy behavior on the second cell at the next occurrence of the on-duration for the second cell. Thus, the multibit being an indication indicating whether the WUS is for the first cell, e.g. PCell, and/or the second cell, e.g. Scell. The WUS may comprise a separate indication per DRX configuration to inform whether to start or not an on-duration timer for the corresponding DRX configuration. The first cell may be a primary cell, and the second cell may be a secondary cell. The indication may be related to initiating a timer or not based on the multibit indication and/or entering a state or not based on the multibit indication. The timer may relate to entering dormancy state or coming out from dormancy state. The multibit indication may comprise the first bit affecting a timer related to change of state of the UE 10 based on which PDCCH monitoring may be adjusted on a first cell and a second cell; and the second bit adjusting the PDCCH monitoring or bandwidth part used only for the second cell.

The radio network node 12 further comprises a memory 1005. The memory comprises one or more units to be used to store data on, such as WUSs, indications, strengths or qualities, grants, scheduling information, timers, applications to perform the methods disclosed herein when being executed, and similar. The radio network node 12 comprises a communication interface comprising transmitter, receiver, transceiver and/or one or more antennas.

The methods according to the embodiments described herein for radio network node 12 are respectively implemented by means of e.g. a computer program product 1006 or a computer program product, comprising instructions, i.e., software code portions, which, when executed on at least one processor, cause the at least one processor to carry out the actions described herein, as performed by the first radio network node 12. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node, such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. MobileSwitching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipment (LEE), laptop mounted equipment (LME), USB dongles, etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi-Fi™, WLAN, CDMA2000, etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
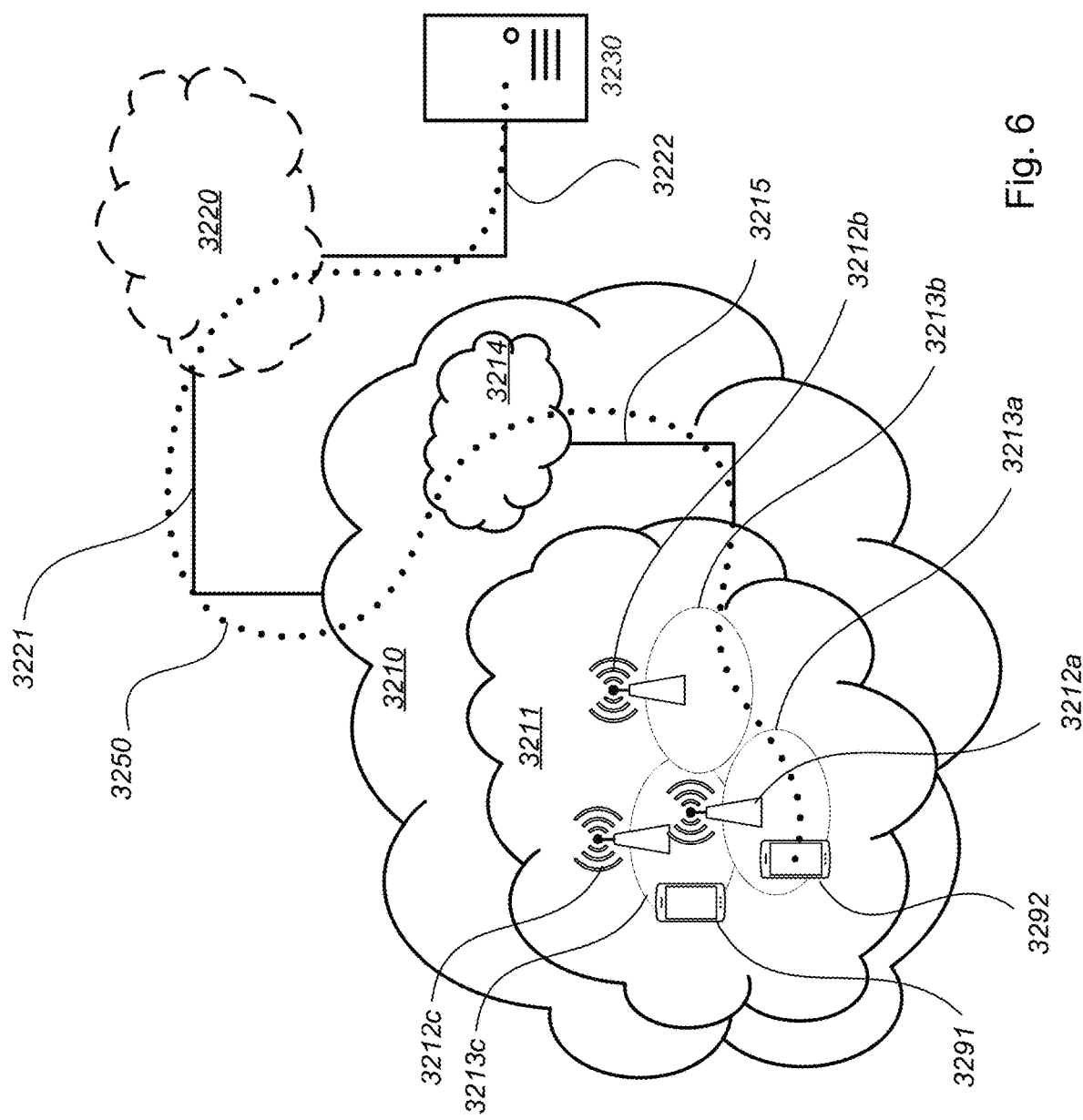
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
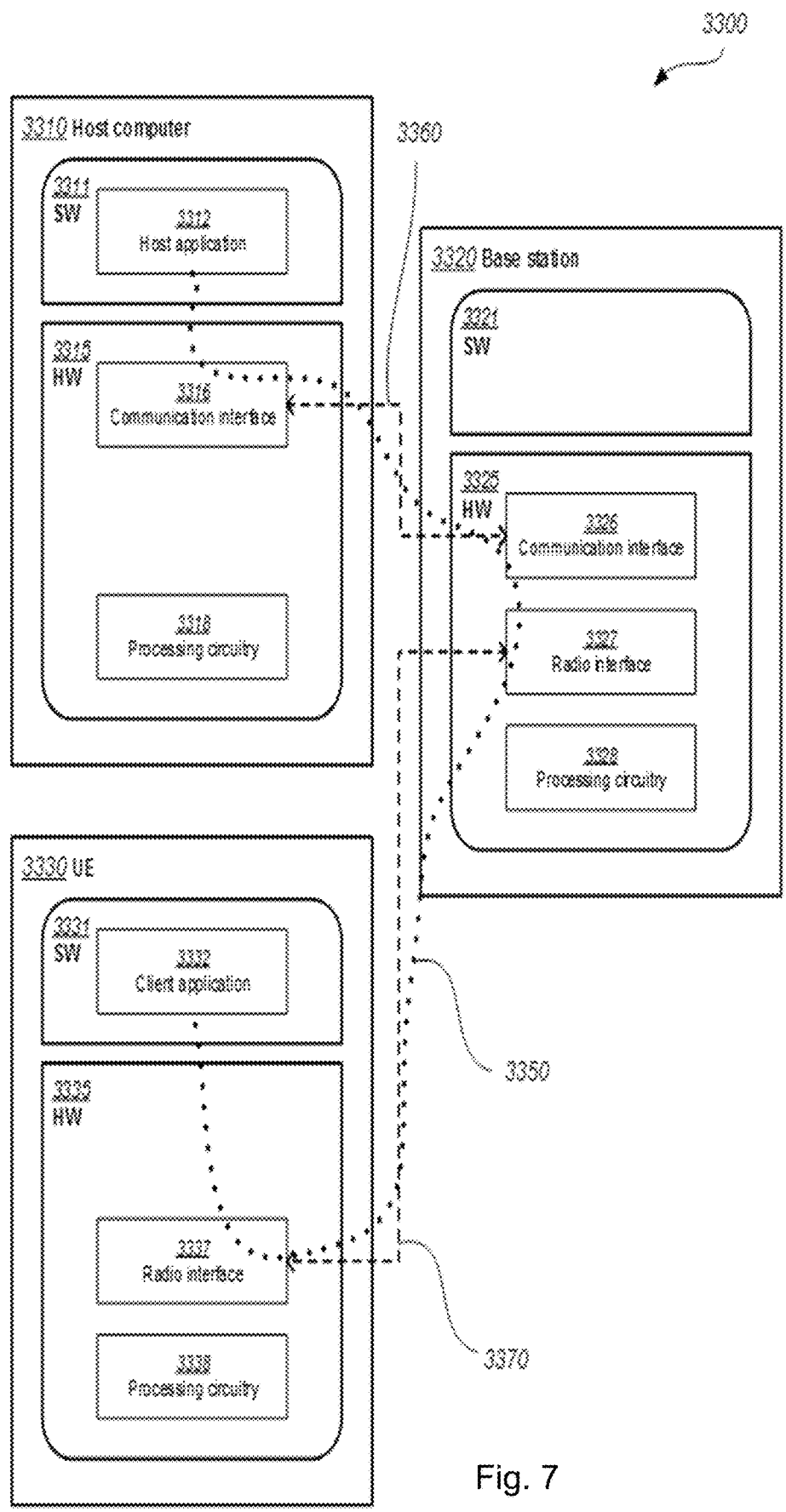
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since first and/or second cells are handled more efficiently and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc. The reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 10:
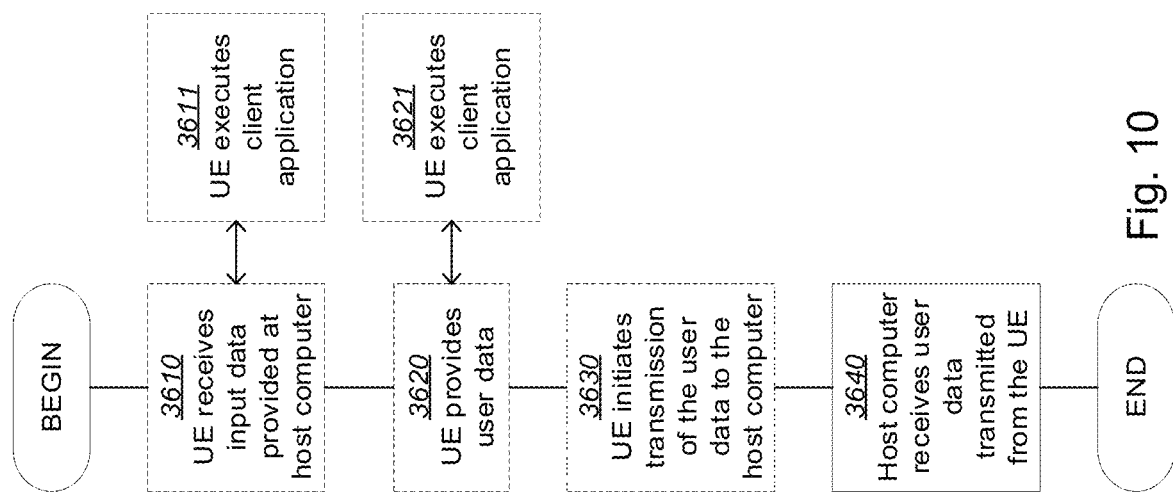

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 11:
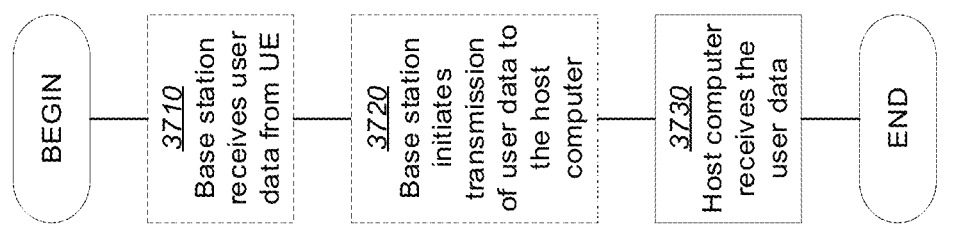

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:

1. A method performed by a user equipment, UE, configured for discontinuous reception, DRX, for communicating in a wireless communication network, the method comprising:
receiving a multibit indication from a radio network node of a first cell, wherein the multibit indication comprises a first bit indicating to start or not to start an on-duration timer at the next occurrence of an on-duration of the discontinuous reception, DRX, configuration, and a second bit, different from the first bit, indicating to apply dormancy or non-dormancy behavior on a second cell at the next occurrence of an on-duration for the second cell; and
performing an action related to the received multibit indication.

2. The method according to claim 1, wherein the first cell is a primary cell, and the second cell is a secondary cell.

3. The method according to claim 1, wherein performing the action comprises initiating a timer or not based on the multibit indication and/or entering a state or not based on the multibit indication.

4. The method according to claim 3, wherein the timer relates to entering dormancy state or coming out from dormancy state.

5. The method according to claim 1, wherein performing the action comprises:
staying in Discontinuous reception, DRX, when the on-duration timer is not started, and when in DRX, stopping physical downlink control channel, PDCCH, monitoring on the first cell and the second cell, and stopping channel state information, CSI, measurement and reporting for the first cell and the second cell.

6. The method according to claim 1, wherein performing the action comprises, when dormancy behavior is indicated, stopping physical downlink control channel, PDCCH, monitoring on the second cell and continuing channel state information, CSI, measurements and reporting for the second cell.

7. The method according to claim 1, wherein performing the action comprises, when dormancy behavior is indicated, switching to a Bandwidth part, BWP, with no physical downlink control channel, PDCCH, monitoring on the second cell.

8. The method according to claim 1, wherein receiving the multibit indication comprises monitoring a downlink control indicator, DCI, format based on physical downlink control channel, PDCCH, outside active time.

9. A non-transitory computer program product comprising instructions which, when executed on at least one processor, cause the at least one processor to carry out the method according to claim 1 as performed by the user equipment or radio network node, respectively.

10. A non-transitory computer-readable storage medium storing a computer program product comprising instructions which, when executed on at least one processor, cause the at least one processor to carry out the method according to claim 1 as performed by the user equipment or radio network node, respectively.

11. A method performed by a radio network node for handling communication of a user equipment, UE, in a wireless communication network, the method comprising:
configuring the UE with a discontinuous reception, DRX, configuration;
transmitting a multibit indication to the UE in a first cell, wherein the multibit indication comprises a first bit indicating to start or not to start an on-duration timer at the next occurrence of an on-duration of the discontinuous reception, DRX, configuration, and a second bit, different from the first bit, indicating to apply dormancy or non-dormancy behavior on a second cell at the next occurrence of an on-duration for the second cell.

12. The method according to claim 11, wherein the first cell is a primary cell, and the second cell is a secondary cell.

13. The method according to claim 11, wherein the indication is related to initiating a timer or not based on the multibit indication and/or entering a state or not based on the multibit indication.

14. The method according to claim 13, wherein the timer relates to entering dormancy state or coming out from dormancy state.

15. A user equipment, UE, configured for discontinuous reception, DRX, for communicating in a wireless communication network, the UE comprising processing circuitry operable to:
receive a multibit indication from a radio network node of a first cell, wherein the multibit indication comprises a first bit indicating to start or not to start, an on-duration timer at the next occurrence of an on-duration of the discontinuous reception, DRX, configuration, and a second bit, different from the first bit, indicating to apply dormancy or non-dormancy behavior on a second cell at the next occurrence of an on-duration for the second cell; and
perform an action related to the received multibit indication.

16. The UE according to claim 15, wherein the first cell is a primary cell, and the second cell is a secondary cell.

17. The UE according to claim 15, wherein the action comprises initiating a timer or not based on the multibit indication and/or entering a state or not based on the multibit indication.

18. The UE according to claim 17, wherein the timer relates to entering dormancy state or coming out from dormancy state.

19. The UE according to claim 15, wherein the processing circuitry is operable to stay in Discontinuous reception, DRX, when the on-duration timer is not started, and when in DRX, operable to stop physical downlink control channel, PDCCH, monitoring on the first cell and the second cell, and to stop channel state information, CSI, measurement and reporting for the first cell and the second cell.

20. The UE according to claim 15, wherein the processing circuitry is operable to, when dormancy behavior is indicated, stop physical downlink control channel, PDCCH, monitoring on the second cell and to continue channel state information, CSI, measurements and reporting for the second cell.

21. The UE according to claim 15, wherein the processing circuitry is operable to, when dormancy behavior is indicated, switch to a Bandwidth part, BWP, with no physical downlink control channel, PDCCH, monitoring on the second cell.

22. The UE according to claim 15, wherein the processing circuitry is operable to, receive the multibit indication by monitoring a downlink control indicator, DCI, format based on physical downlink control channel, PDCCH, outside active time.

23. A radio network node for handling communication of a user equipment, UE, in a wireless communication network, the radio network node comprising processing circuitry operable to:

configuring the UE with a discontinuous reception, DRX, configuration;

transmit a multibit indication to the UE in a first cell, wherein the multibit indication comprises a first bit indicating to start or not to start, an on-duration timer at the next occurrence of an on-duration of the discontinuous reception, DRX, configuration, and a second bit, different from the first bit, indicating to apply dormancy or non-dormancy behavior on a second cell at the next occurrence of an on-duration for the second cell.

24. The radio network node according to claim 23, wherein the first cell is a primary cell, and the second cell is a secondary cell.

25. The radio network node according to claim 23, wherein the indication is related to initiating a timer or not based on the multibit indication and/or entering a state or not based on the multibit indication.

26. The radio network node according to claim 25, wherein the timer relates to entering dormancy state or coming out from dormancy state.

* * * * *